(12) United States Patent
Botte

(10) Patent No.: US 9,199,867 B2
(45) Date of Patent: Dec. 1, 2015

(54) REMOVAL OF METALS FROM WATER

(75) Inventor: Gerardine G. Botte, Athens, OH (US)

(73) Assignee: Ohio University, Athens, OH (US)

( * ) Notice: Subject to any disclaimer, the term of this patent is extended or adjusted under 35 U.S.C. 154(b) by 0 days.

(21) Appl. No.: 13/264,441

(22) PCT Filed: Apr. 14, 2010

(86) PCT No.: PCT/US2010/031033
§ 371 (c)(1),
(2), (4) Date: Oct. 14, 2011

(87) PCT Pub. No.: WO2010/120882
PCT Pub. Date: Oct. 21, 2010

(65) Prior Publication Data
US 2012/0024719 A1    Feb. 2, 2012

Related U.S. Application Data

(60) Provisional application No. 61/169,018, filed on Apr. 14, 2009.

(51) Int. Cl.
*C02F 1/461* (2006.01)
*C02F 1/467* (2006.01)
(Continued)

(52) U.S. Cl.
CPC ........... *C02F 1/4678* (2013.01); *C02F 2101/16* (2013.01); *C02F 2101/20* (2013.01);
(Continued)

(58) Field of Classification Search
CPC ............... C02F 1/4678; C02F 2101/16; C02F 2101/20; C02F 2201/46135; C02F 2201/4618; C02F 2209/02; C02F 2209/06

USPC ......................................... 205/261, 742, 771
See application file for complete search history.

(56) References Cited
U.S. PATENT DOCUMENTS 3,582,485 A    6/1971   Guter et al.
3,878,564 A    4/1975   Yao et al.
(Continued)

FOREIGN PATENT DOCUMENTS

CA    1214748 A1    12/1986
DE    4035316 A1    5/1992
(Continued)

OTHER PUBLICATIONS

HyperPhysics. "Table of Standard Electrode Potentials." Apr. 4, 2008 capture. Georgia State University Department of Physics and Astronomy. <http://hyperphysics.phy-astr.gsu.edu/Hbase/tables/electpot.html>.*

(Continued)

*Primary Examiner* — Keith Hendricks
*Assistant Examiner* — Steven A. Friday
(74) *Attorney, Agent, or Firm* — Wood, Herron & Evans, LLP

(57) ABSTRACT

A method of purifying water is provided that includes applying a voltage to an electrolytic cell 10 that includes an anode 14, a cathode 16 and an alkaline electrolyte composition having a pH value of about 11 or less. The alkaline electrolyte composition 13 includes at least one waste metal ion to be reduced, and a sacrificial reductant, such as urea, ammonia or a combination thereof, to be oxidized. According to the disclosed method, the voltage is applied across the cathode 16 and the anode 14 and is sufficient to reduce the at least one waste metal ion to form at least one elemental metal species at the cathode 16, and to oxidize the sacrificial reductant at the anode 14. Additionally, the applied voltage does not affect the generation of hydrogen at the cathode 16 and/or oxygen at the anode 14.

19 Claims, 2 Drawing Sheets

(51) Int. Cl.
  *C02F 101/16* (2006.01)
  *C02F 101/20* (2006.01)
(52) U.S. Cl.
  CPC ............ *C02F2201/4618* (2013.01); *C02F 2201/46135* (2013.01); *C02F 2209/02* (2013.01); *C02F 2209/06* (2013.01); *Y02W 10/37* (2015.05)

(56) References Cited

U.S. PATENT DOCUMENTS

| | | | |
|---|---|---|---|
| 3,959,110 A | | 5/1976 | Burgess |
| 3,984,295 A | | 10/1976 | Kametani et al. |
| 4,045,314 A | | 8/1977 | Rod et al. |
| 4,330,377 A | | 5/1982 | Franks, Jr. |
| 4,388,163 A | | 6/1983 | Richter et al. |
| 4,394,239 A | | 7/1983 | Kitzelmann et al. |
| 4,445,990 A | * | 5/1984 | Kim et al. ............. 205/751 |
| 4,663,006 A | | 5/1987 | Yao et al. |
| 4,834,850 A | * | 5/1989 | de Nora et al. ........ 205/566 |
| 4,954,230 A | * | 9/1990 | Kirch ................... 210/665 |
| 5,641,890 A | | 6/1997 | Wesley et al. |
| 6,270,650 B1 | * | 8/2001 | Kazi et al. ............ 205/753 |
| 6,298,996 B1 | * | 10/2001 | Spiegel et al. ......... 205/754 |
| 6,432,284 B1 | | 8/2002 | Narayanan et al. |
| 6,607,707 B2 | | 8/2003 | Reichman et al. |
| 6,890,419 B2 | | 5/2005 | Reichman et al. |
| 7,157,012 B2 | | 1/2007 | Umezawa |
| 2003/0111349 A1 | * | 6/2003 | Sierakowski et al. ..... 205/67 |
| 2004/0251199 A1 | * | 12/2004 | Benavides ............ 210/634 |
| 2005/0211569 A1 | | 9/2005 | Botte |
| 2006/0076297 A1 | * | 4/2006 | Akahori et al. ........ 204/665 |
| 2006/0283715 A1 | * | 12/2006 | Diaddario et al. ....... 205/245 |
| 2009/0095636 A1 | | 4/2009 | Botte |

FOREIGN PATENT DOCUMENTS

| | | | |
|---|---|---|---|
| DE | 196 04 901 A1 | 8/1997 |
| WO | 9638384 A1 | 12/1996 |
| WO | 2005035444 A2 | 4/2005 |
| WO | 2006121981 A2 | 11/2006 |
| WO | 2007047630 A2 | 4/2007 |
| WO | 2007133534 A2 | 11/2007 |
| WO | 2010120882 A1 | 10/2010 |

OTHER PUBLICATIONS

Chemistry World. "Urine turned into hydrogen fuel." Jul. 2, 2009. Royal Society of Chemistry. <http://www.rsc.org/chemistryworld/news/2009/july/02070902.asp> Retrieved Jun. 25, 2014.*
Pavlović, M.G. and Dekanski, A. "On the use of platinized and activated titanium anodes in some electrodeposition processes." Journal of Solid State Electrochemistry. vol. 1, Issue 3. Nov. 1997. pp. 208-214.*
Huang, C-H. "Effect of surfactants on recovery of nickel from nickel plating wastewater by electrowinning." Water Research. vol. 29, Issue 8. Aug. 1995. pp. 1821-1826.*
Yarris, L. "Environmentally friendly technique recovers metals from wastewater." Lawrence Berkeley National Laboratory (USDOE). Aug. 26, 1994.*
Boggs, B.K. and Botte, G.G. "Urea Electrolysis in Alkaline Media and Its Applications"/"Alkaline Urea Electrolysis and Possible Applications." 214th ECS Meeting; General Student Poster Session Abstract. The Electrochemical Society. Oct. 13, 2008.*
U.S. Patent Office, Search Report for PCT/US2010/031033, dated May 26, 2010, 8 pages.
Alam, M. S., et al., "Electrolyte purification in energy-saving monovalent copperelectrowinning processes," Hydrometallurgy, 87, 36-44 (2007).
Vitse, Frederic et al., On the Use of Ammonia Electrolysis for Hydrogen Production, Journal of Power Sources, 2005, pp. 18-26, vol. 142.
Valenzuela-Muniz, A.M., et al., Carbon Nanotubes Growth Over Titanium as Catalyst Support for Hydrogen Production, The Electrochemical Society, 214th ECS Meeting, Abstract #2 Oct. 2008, 1 page, Honolulu, Hawaii.
Singh, Deepika et al., Ab initio Calculations Combined with Experimental Techniques for Analyzing Urea Electrooxidation, The Electrochemical Society, 214th ECS Meeting, Abstract #14, Oct. 2008, 1 page, Honolulu, Hawaii.
Boggs, Bryan K. et al, Urea Electrolysis in Alkaline Media and Its Applications, The Electrochemical Society, 214th ECS Meeting, Abstract #23, Oct. 2008, 1 page, Honolulu, Hawaii.
Di Giulio, Simmona, et al. Fate of Organic Nitrogen during Electrooxidation over Conductive Metal Oxide Anodes, Ind. Eng. Chem. Res., 2007, pp. 6783-6787, vol. 46.
Jara, Carlos Carlesi, et al., Combined direct and indirect electroxidation of urea containing water, J. Appl. Electrochem., 2008, pp. 915-922, vol. 38.
Osetrova, N. V., et al., Products of Anodic Oxidation of Carbamide: Effect of Anionic Composition of Solution, Russian Journal of Electrochemistry, 2002, pp. 266-269, vol. 38.
U.S. Patent and Trademark Office, Official Action for U.S. Appl. No. 12/250,864, mailed Oct. 12, 2011, 6 pp.
European Patent Office, Supplementary Search Report in corresponding European Application No. EP 10 76 5087, mailed Jan. 11, 2013, 4 pp.
Espacenet, EPO English Machine Translation of Application No. DE 196 04 901 (A1), Published Aug. 14, 1997, http://worldwide.espacenet.com, retrieved Feb. 25, 2013, 5 pp.
Chinese Patent Office, Office Action issued in corresponding Application No. 201080024744.7, mailed Feb. 5, 2013, 25 pp.
European Patent Office, International Search Report & Written Opinion issued in corresponding Application No. PCT/US2013/050601, mailed Nov. 26, 2013, 10 pp.
Espacenet, EPO English Machine Translation of Application No. DE 40 35 316 (A1), Published May 14, 1992, http://worldwide.espacenet.com, retrieved Dec. 30, 2013, 7 pp.

* cited by examiner

REMOVAL OF METALS FROM WATER

RELATED APPLICATIONS

This application claims the benefit of U.S. Provisional Patent Application Ser. No. 61/169,018, entitled SIMULTANEOUS REMOVAL OF AMMONIA, UREA AND METALS FROM WATER, filed on Apr. 14, 2009, the disclosure of which is incorporated herein by reference in its entirety.

FIELD OF THE INVENTION

The invention relates to purifying water. In particular, the invention relates to an efficient electrolytic method for removing metal ions from water in the presence of sacrificial reductants, such as urea, ammonia or a combination thereof.

BACKGROUND

Ammonia, urea, and metals are species that are commonly presented in wastewater that is derived from different sources, e.g., industrial, livestock, ships, hydrometallurgy, electronics, and the like.

There are different processes that allow the removal of these species individually, including for example, chemical precipitation, ion exchange, reverse osmosis, surface clay filtration, electrowinning, electrodialysis, air/steam stripping, anaerobic biological oxidation/nitrification, and breakpoint chlorination. However, none of these processes provide the capability of performing the removal of the aforementioned species simultaneously. Moreover, the required regulatory limits or the desired low levels cannot be achieved efficiently.

For example, electrowinning may be used for the removal of metal ions in aqueous solutions. And while electrowinning can recover 90 to 95% of the available metal ions, it is known to operate efficiently only at high metal on concentrations. For example, as the concentration of the metal ions decrease to lower concentrations, such as about 500 mg/L (parts per million or ppm) or less, higher voltages and/or current densities must be used. At these low concentration conditions, the excess electrical energy is diverted into producing hydrogen at the cathode, which thereby competes with the reduction of the metal. Moreover, a substantial amount of energy is consumed by the hydrogen generation. As such, as the low levels required by regulatory agencies, such as the Environmental Protection Agency, are approached, the process becomes increasingly less efficient.

Further, anaerobic biological oxidations may be used for the removal of ammonia. However, these methods require a strict control of the pH to keep the bacteria alive, and require long retention times. Moreover, these processes have not been shown to be applicable for the removal of metals from waste water.

Osmosis can be used to filter water from impurities, but it does not ultimately remove the impurities and instead merely concentrates them. In addition, removal of ammonia by this process requires expensive membranes and high pressure.

Therefore, a need still exists for an efficient and simultaneous method for removing metals, and urea and/or ammonia from waste water.

SUMMARY OF THE INVENTION

The present invention is premised on the realization that the simultaneous removal of multiple impurities from waste water can be efficiently achieved to provide clean water. More particularly, the present invention is premised on the realization that metal ions and a sacrificial reductant, such as urea and/or ammonia, can be efficiently removed from waste water via electrolysis using an electrolytic cell.

In accordance with the present invention, a method of purifying water is provided. The method includes applying a voltage to an electrolytic cell that comprises an anode, a cathode and an alkaline electrolyte composition having a pH value of about 11 or less. The alkaline electrolyte composition comprises at least one metal ion to be reduced, and a sacrificial reductant. Moreover, the voltage is applied across the cathode and the anode that is sufficient to reduce the at least one metal ion to form at least one elemental metal species at the cathode, and to oxidize the sacrificial reductant at the anode, and wherein the voltage is less than a value necessary to affect a substantial generation of hydrogen at the cathode and/or a substantial generation of oxygen at the anode.

The objects and advantages of the present invention will be further appreciated in light of the following detailed description and example in which:

DETAILED DESCRIPTION OF THE INVENTION

Figure 1:
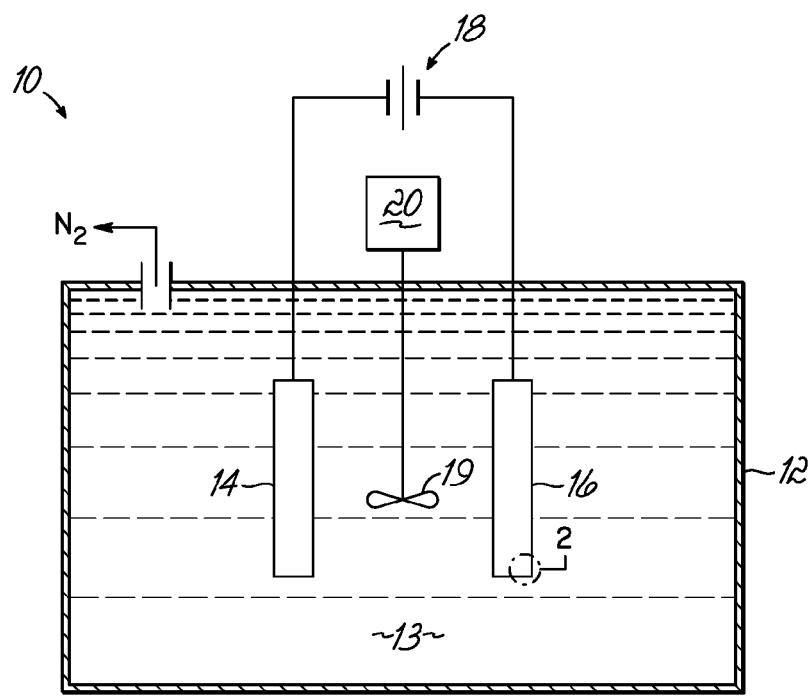
FIG. 1 is a diagrammatical view of a simplified electrolytic cell configured for batch processing.
Figure 3:
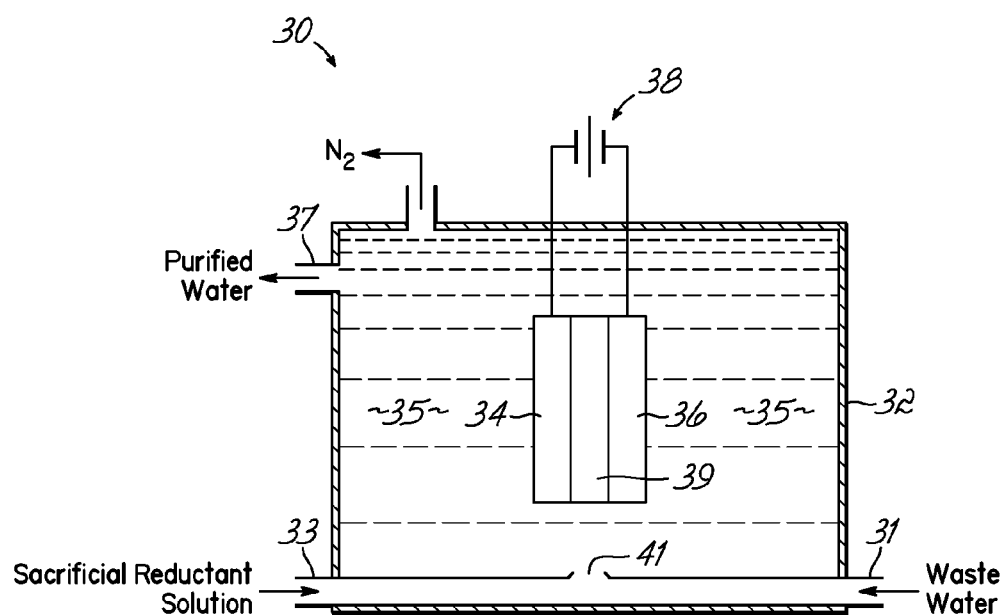
FIG. 3 is a diagrammatical view of a simplified electrolytic cell configured for flow cell processing.

FIG. 1 is a diagrammatic depiction of a simplified electrolytic cell 10 configured for batch processing to achieve the simultaneous removal of metal ions and a sacrificial reductant, such as urea and/or ammonia. A simplified electrolytic cell 10 representing a single batch-type arrangement comprises a tank 12, which may be made of light gauge iron, steel or other material not attacked by an alkaline electrolyte composition 13. An electrode assembly comprising an anode 14 and a cathode 16 is suspended within an alkaline electrolyte composition 13 contained in tank 12 that may be agitated or stirred by agitator 19 rotated by motor 20. In this single batch-type arrangement, the alkaline electrolyte composition 13 includes at least one metal ion species, as well as an effective amount of a sacrificial reductant, such as urea and/or ammonia, as described below. The anode 14 and cathode 16 are electrically connected to a voltage source 18, which provides the electrical energy for the simultaneous reduction of the at least one metal ion species and the oxidation of the sacrificial reductant, such as urea and/or ammonia present in the alkaline electrolyte composition 13. It will be readily apparent to one of ordinary skill in the art that the above cell is readily adaptable to a continuous flow cell configuration, which is schematically shown in FIG. 3 and discussed further below. Further it may be appreciated that multiple electrolytic cells may be used in combination, either in series configuration, parallel configuration, or a combination thereof.

Embodiments of the present invention find their application on the removal of metals and a sacrificial reductant, such as ammonia and/or urea, from water. Waste water may be purified with high efficiency, as well as, to levels that satisfy regulatory limits for discharge of the purified water to the environment. Further, it should be appreciated that the present method may be used for the recovery of metals in different industrial processes.

In the present invention, the metal ions are removed from the waste water by the reduction of a cationic metal species (i.e., oxidized metal) to the elemental form of the metal, which occurs at the cathode 16, according to the following general equation:

$$M^{+x} + x\,e^- \rightarrow M \qquad \text{Equation 1}$$

wherein x is an integer representing the oxidation state of the metal (M). As the metal ions convert to the elemental form at the cathode 16, the elemental metal is deposited on the cathode 16.

According to the present invention, the waste water includes metals in the form of cations, (i.e., oxidized forms of a metal). By way of example, but without limitation, metals amenable to the present method of electrochemical purification of waste water include zinc, chromium, tantalum, gallium, iron, cadmium, indium, thallium, cobalt, nickel, tin, lead, copper, bismuth, silver, mercury, chromium, niobium, vanadium, manganese, aluminum, and combinations thereof. Accordingly, one metal suitably removed from an aqueous sample included nickel.

According to embodiments of the present invention, the waste water may include metal concentrations from about 500 pm and lower. For example, from about 250 ppm and lower, from about 100 ppm and lower, or from about 50 ppm and lower. Moreover, the purified water obtained from the above the above waste water samples may have metal concentrations sufficiently low to permit direct discharge to the environment without further processing.

According to embodiments of the present invention, the waste water may include a sacrificial reductant, such as urea or ammonia, which effectively lowers the electrochemical potential of the electrolytic cell. Advantageously, waste water may contain a sufficient quantity of a sacrificial reductant, such as urea or ammonia from urine, which would thereby permit the removal of one or more waste metals, along with urea and/or ammonia, simultaneously. It should be appreciated by skilled artisans that other sacrificial reductants, such as ethanol or methanol, may also be adaptable to embodiments of the present invention.

The electrodes, (i.e., anode 14 and cathode 16) may each comprise a conductor or a support that can be coated with a more active conducting component. The conducting component of the cathode 16 is not particularly limited to any species of conductor, but the conducting component should be comprised of a substrate whereon the metal can deposit. For example, the conducting component of the cathode 16 may comprise carbon, such as carbon fibers, carbon paper, glassy carbon, carbon nanofibers, carbon nanotubes, and the like; or conducting metals, such as cobalt, copper, iridium, iron, nickel, platinum, palladium, ruthenium, rhodium and mixtures and alloys thereof.

Figure 2:
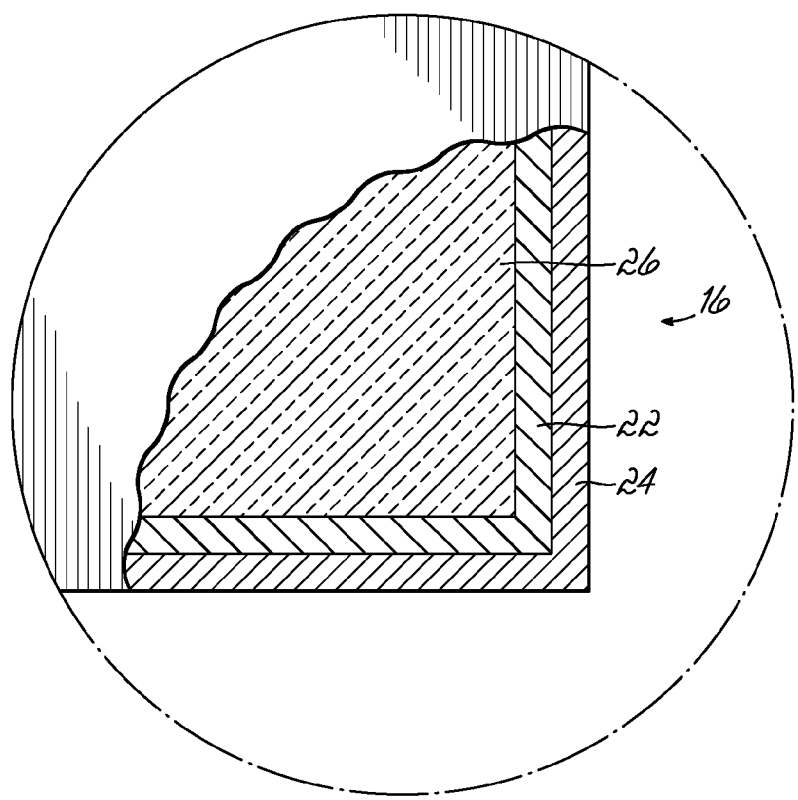
FIG. 2 is a cross-sectional view of a cathode in the electrolytic cell shown in FIG. 1.

Thus, as shown in FIG. 2, an exemplary cathode 16 shows an underlying support material 26 that has been coated with a layer of an active conducting component 22 that is compatible with electrodepositing the reduced waste metal. A deposited waste metal layer 24 forms on the layer of the active conducting component 22, to provide purified water.

Moreover, metal deposition rates are related to the available surface area. As such, large surface area substrates are generally preferred. The cathode substrate should be able to withstand alkaline conditions. Examples of substrates include: conductive metals, carbon fibers, carbon paper, glassy carbon, carbon nanofibers, carbon nanotubes, and the like. For example, the conductive metal of the cathode substrate may be cobalt, copper, iridium, iron, nickel, platinum, palladium, ruthenium, rhodium and mixtures and alloys thereof. In another example, the cathode 16 comprises platinum, such as platinum deposited on carbon paper.

In the present invention, the oxidation of a sacrificial reductant occurs at the conducting component of the anode 14 in an alkaline electrolyte composition or medium. Exemplary sacrificial reductants urea and ammonia are oxidized at the conducting component of the anode 14 in an alkaline electrolyte medium according to the following equations:

$$2NH_3 + 6OH^- \rightarrow N_2 + 6H_2O + 6e^- \;(-0.77\text{ V vs. SHE}) \qquad \text{Equation 2:}$$

$$CO(NH_2)_2 + 6OH^- \rightarrow N_2 + 5H_2O + CO_2 + 6e^- \;(-0.034\text{ V vs. SHE}) \qquad \text{Equation 3:}$$

Therefore, the conducting component of the anode 14 may be one or more metals active toward adsorbing and oxidizing the sacrificial reductants urea and/or ammonia.

For example, one or more metals active toward the oxidation of ammonia include metals disclosed in commonly-assigned U.S. Pat. No. 7,485,211, which is incorporated herein in its entirety. By way of further example, the removal of ammonia may be performed with a conducting component comprising platinum, iridium, ruthenium, rhodium and their combinations. The conducting component may be co-deposited as alloys and/or by layers.

Additionally, metals active toward the oxidation of urea include metals disclosed in commonly-assigned U.S. Patent Application Publication No. 2009/0095636, which is incorporated herein in its entirety. For example, the removal of urea may be performed with a conducting component comprising transition metals, such as nickel; or precious metals such as platinum, iridium, ruthenium, rhodium; and their combinations. Especially effective metals for the oxidation of urea include nickel and other transition metals. The metals may be co-deposited as alloys and/or by layers. Moreover, the active metals may be in an oxidized form, such as nickel oxyhydroxide.

Further, metals active toward the oxidation of ethanol and methanol include metal disclosed in commonly-assigned U.S. Patent Application Publication No. 2008/0318097, which is incorporated herein in its entirety.

By way of example and without limitation, the anode 14 may comprise nickel electrodeposited on a carbon support, such as carbon fibers, carbon paper, glassy carbon, carbon nanofibers, or carbon nanotubes, or nickel formed into beads and suspended in a nickel gauze.

One electrode found to be favorable to the oxidation of urea is an activated nickel oxyhydroxide modified nickel electrode (NOMN). For example, the NOMN electrode may be comprised of metallic substrates (Ni foil, Ni gauze, Ti foil and Ti gauze) that have been electroplated with Ni using a Watts bath. Specifically, the plated nickel electrode may be activated by being immersed in a solution containing nickel sulfate, sodium acetate, and sodium hydroxide at 33° C. Stainless steel may be used as a counter electrode. The plated nickel electrode may be used as the anode and cathode by manual polarity switching at 6.25 A/m² for four 1 minute cycles and 2 two minute cycles. Finally, the electrode may be kept as the anode at the same current and maintained thereat for two hours. The activated electrodes yield higher current densities than those of M/Ni, where M represents a metallic substrate.

While anodes having large surface areas are favorable, the structure of the anode 14 is not limited to any specific shape or form. For example, the conducting component may be formed as foil, wire, gauze, bead or coated onto a support. Suitable anode 14 support materials may be chosen from many known supports, such as foils, meshes and sponges, for example. The support material may include, but is not limited to, Ni foils, Ti foils, carbon fibers, carbon paper, glassy carbon, carbon nanofibers, and carbon nanotubes. Aside from these specific support materials listed, other suitable supports will be recognized by those of ordinary skill in the art.

According to embodiments of the present invention, an alkaline electrolyte composition 13 is used in the process. The alkaline electrolyte composition 13 may include any suitable hydroxide salt. An alkali metal hydroxide or alkali earth metal hydroxide salt, such as lithium hydroxide, rubidium hydroxide, cesium hydroxide, barium hydroxide, strontium hydroxide, potassium hydroxide, sodium hydroxide, magnesium hydroxide, calcium hydroxide, and mixtures thereof may be used. In particular, the alkaline electrolyte composition 13 includes potassium hydroxide.

Moreover, the alkaline electrolyte composition 13 may be a solution, as shown in FIG. 1. Accordingly, the concentration of hydroxide should be sufficiently low to avoid precipitation of a metal hydroxide form of the metal targeted for removal. Accordingly, the concentration of hydroxide used for a particular system may be estimated from the solubility product of the metal hydroxide under consideration. Generally, a concentration of hydroxide higher than 0.2 M is not recommended during the electrolytic removal of metals according to the present invention. For example, to avoid precipitating the metal hydroxide form of many of the metals ions listed above, the pH value is advantageously about 11 or less. As yet another example, the pH may have a value within a range from about 8 to about 11, or within a range from about 9 to about 10.

In an alternative embodiment, the alkaline electrolyte composition may comprise a gel, such as a solid polymer electrolyte. Suitable alkaline electrolytic gels include, for example, those gels containing polyacrylic acid, polyacrylates, polymethacrylates, polyacrylamides, sulfonated-polymers and similar polymers and copolymers.

The alkaline electrolytic gel may be prepared using any suitable method. One method includes forming a polymer and then injecting the hydroxide salt electrolyte into the polymer to form an alkaline electrolyte gel or polymeric mixture. In another method, the monomer may be polymerized in the presence of a hydroxide salt electrolyte.

Although not shown in FIG. 1, a separator may be used to compartmentalize the anode 14 and cathode 16. Separators should be constructed from materials chemically resistant to the alkaline electrolyte composition 13. Accordingly, many polymers are suitable for constructing separators, such as Teflon® and polypropylene. Further, separators may comprise an alkaline electrolytic gel. While separators are not required for simple batch-type arrangements, they may prove advantageous for continuous flow electrochemical cells, as discussed next.

According to another embodiment of the present invention, a flow cell configuration is shown in FIG. 3, which provides a diagrammatic depiction of a simplified electrolytic cell 30 for the simultaneous removal of metal ions and urea and/or ammonia from waste water. A simplified electrolytic cell 30 representing a flow cell arrangement comprises a housing 32, which may be made of light gauge iron, steel or other material that is stabile in an alkaline medium. An electrode assembly comprising an anode 34 and a cathode 36 is within the housing 32. In this flow cell arrangement, the anode 34 and the cathode 36 are separated by a separator 39. The inlet port 31 permits the introduction of the waste water that includes at least one metal ion species, as well as an effective amount of a sacrificial reductant, such as urea and/or ammonia. Conversely, should the waste water be free of, or contain an insufficient quantity of the sacrificial reductant, a second solution containing the desired concentration of a sacrificial reductant, such as ethanol, methanol, urea, ammonia and combinations thereof, may be added separately through the inlet port 33 to permit mixing with the waste water at the inlet junction 41. The anode 34 and the cathode 36 are electrically connected to a voltage source 38, which provides the electrical energy for the reduction of the at least one metal ion species at the cathode 36 and for the oxidation of the sacrificial reductant at the anode 34 contained in the solution 35. The purified water exits the flow cell arrangement of electrolytic cell 30 through outlet 37.

According to one configuration, the pH value of the waste water may be adjusted to the desired range prior to introduction to the electrolytic cell 30. According to another configuration, the pH of the waste water may be adjusted while being introduced to the electrolytic cell 30, for example, by a separate solution of hydroxide salt. Accordingly, in one embodiment the separate solution of hydroxide salt may also include a sacrificial reductant, such as urea and/or an ammonia solution. According to another embodiment, the anode 34 may be coated with an alkaline electrolytic gel.

Electrolytic cells, such as 10 and 30 may operate over varying ranges of temperature and pressure. The operating pressure may be about atmospheric pressure or ambient pressure with no upper pressure limit other than the physical limits of the reaction vessel. The operating temperature range may be from about the freezing point of the waste water to about 100° C. and may be related to the operating pressure of the electrolytic cell. At one atmosphere of pressure, it is practical to keep the operating temperature to about 80° C. or less, because at higher temperatures it is difficult to maintain ammonia in solution. For example, an acceptable operating temperature may be within a range from about 0° C. to about 80° C.; or from about 20° C. to about 65° C. More specifically, an operating temperature within a range from about 20° C. to about 30° C. is particularly useful.

The present invention is not limited to any particular source of electricity. That is, electricity can be provided from renewable energy sources: wind, solar, etc., storage sources (batteries), and conventional grid power generation.

But according to embodiments of the present invention, the voltage difference applied across the anode 14 and the cathode 16 of the electrochemical cell 10 is maintained at a value that provides for the reduction of the waste metal ions while avoiding substantial hydrogen generation at the cathode or substantial oxygen generation at the anode. As used herein, "substantial" hydrogen evolution and "substantial" oxygen evolution means that less than about 20% of the electrical energy is spent generating hydrogen and/or oxygen. In other words, about 80% or more of the applied voltage is spent removing the waste metal ions. For example, in one embodiment, less than about 10% of the electrical energy is spent generating hydrogen and/or oxygen. In yet another embodiment, less than about 5% of the electrical energy is spent generating hydrogen and/or oxygen. In yet another embodiment, less than about 3% of the electrical energy is spent generating hydrogen and/or oxygen. In one exemplary embodiment, the voltage applied across the anode 14 and the cathode 16 does not generate any hydrogen at the cathode.

According to embodiments of the present invention, the voltage difference applied across the anode 14 and the cathode 16 of a single electrolytic cell may be maintained at a voltage of about 1.1 volts or lower. In another exemplary embodiment, the single cell voltage difference may be at a value between about 0.01 volts to about 1.1 volts. In yet another embodiment, the single cell voltage may be at a value of about 0.2 volts to about 0.9 volts.

Thus, in accordance with embodiments of the invention, the removal of ammonia and waste metals from waste water may be achieved by simultaneously contacting the waste water with the anode 14 and the cathode 16 of the electrochemical cell 10, as shown in FIG. 1, or the anode 34 and the cathode 36 of the electrochemical cell 30. At the anode (14 or 34) of the electrochemical cell (10 or 30) the electro-oxidation of ammonia in alkaline media takes place according to Equation 2 as discussed above, while at the cathode (16 or 36) of the electrochemical cell (10 or 30) the reduction of the waste metal species takes place according to Equation 1 to thereby deposit the reduced waste metal on the cathode (16 or 36), as shown in cut-away view in FIG. 2.

It will be readily appreciated by those skilled in the art of electrochemistry that the reactions at the cathode (16 or 36) as well as the applied voltage depend on the metal and/or metals present in solution. Simultaneous removal of several waste metals can be achieved by operating the cell at the voltage necessary for reducing the metal with the highest reduction potential.

Moreover, it should be appreciated that the presence of a sacrificial reductant, such as ammonia, which is oxidized at the anode, permits the voltage applied to the electrochemical cell (10 or 30) to be sustained at a value wherein a substantial production of hydrogen does not take place at the cathode (16 or 36), nor is a substantial production of oxygen occur at the anode (14 or 34). For example, waste metals such as zinc, chromium, tantalum, gallium, iron, cadmium, indium, thallium, cobalt, nickel, tin, lead, chromium, niobium, vanadium, manganese, aluminum, and combinations thereof can be removed using a cell voltage that is sustained no higher than about 1.1 V.

Similar to that described above for ammonia, the removal of urea and waste metals from waste water may be achieved by simultaneously contacting the waste water with the anode 14 and the cathode 16 of the electrochemical cell 10, as shown in FIG. 1, or the anode 34 and the cathode 36 of the electrochemical cell 30. At the anode (14 or 34) of the electrochemical cell (10 or 30) the electro-oxidation of urea in alkaline media takes place according to Equation 3 as discussed above, while at the cathode (16 or 36) of the electrochemical cell (10 or 30) the reduction of the waste metal species takes place according to Equation 1 to thereby deposit the reduced waste metal on the cathode (16 or 36).

Moreover, it should be appreciated that the presence of urea, which is oxidized at the anode, permits the voltage applied to the electrochemical cell (10 or 30) to be sustained at a value where the reduction of hydrogen does not take place at the cathode (16 or 36) and oxygen is not generated at the anode (14 or 34). For example, waste metals such as zinc, chromium, tantalum, gallium, iron, cadmium, indium, thallium, cobalt, nickel, tin, lead, copper, bismuth, silver, mercury, and combinations thereof can be removed using a cell voltage that is sustained no higher than about 1.1 V.

According to the foregoing, it should be readily apparent that the electrolytic method disclosed provides for the simultaneous removal of the waste metal, ammonia and urea, by modifying the anode (14 or 34) of electrochemical cell (10 or 30) to facilitate the oxidation of urea and ammonia.

The present invention will be further appreciated in view of the following example.

EXAMPLE

An electrochemical cell was built for the removal of ammonia and nickel from a synthetic waste solution. The synthetic waste solution was prepared by combining nickel (II) sulfate, ammonium sulfate and potassium hydroxide in DI water in appropriate amounts to prepare 250 milliliters of a solution having: Ni(II)=31.25 ppm (mg/l), $NH_3$=0.05 M, and KOH=0.05 M. The synthetic waste solution had a pH value of 10, as measured by a pH meter.

The anode of the cell was constructed of platinum deposited on carbon paper (2 cm×2 cm), while the cathode of the cell was a nickel foil (2 cm×4 cm). The electrochemical cell was operated at 25° C. while at atmospheric pressure and a constant voltage of 0.9 V was applied. A constant current of 10 mA was observed during the operation of the cell. After 1 hour, 1 mg of nickel metal was deposited at the cathode of the cell, which calculated to be an efficiency of about 100% for the deposition of nickel [Ni (II)+2e$^-$→Ni (0)] according to Faraday's Law. The cathode of the cell was analyzed by scanning electron microscopy and X-ray diffraction to confirm the deposition of nickel.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described.

Accordingly, departures may be made from such details without departing from the scope of the general inventive concept.

What is claimed is:

1. A method of purifying water comprising:
   applying a voltage to an electrolytic cell comprising
      a cathode with a first conducting component,
      an anode with a second conducting component selected from the group consisting of cobalt, copper, iron, nickel, platinum, iridium, ruthenium, rhodium, and mixtures thereof and alloys thereof, and
      an alkaline electrolyte composition in electrical communication with the anode and the cathode, wherein the alkaline electrolyte composition has a pH value of about 11 or less and wherein the alkaline electrolyte composition comprises at least one waste metal ion to be reduced, and a sacrificial reductant selected from the group consisting of urea, ammonia, ethanol, methanol, and a combination thereof,
   wherein the voltage is applied across the cathode and the anode and is sufficient to reduce the at least one waste metal ion to form at least one elemental metal species at the cathode, and to oxidize the sacrificial reductant at the anode, and less than about 20% of the voltage is spent generating hydrogen at the cathode and/or oxygen at the anode, and
   wherein the voltage difference is a single cell voltage with a value of about 1.1 volts or less.

2. The method of claim 1, wherein the first conducting component is selected from the group consisting of cobalt, copper, iron, nickel, platinum, iridium, ruthenium, rhodium, and mixtures thereof and alloys thereof.

3. The method of claim 1, wherein the first conducting component is nickel and the second conducting component is platinum.

4. The method of claim 1, wherein the anode further comprises a support material at least partially layered with the second conducting component.

5. The method of claim 1, wherein the alkaline electrolyte composition further comprises a hydroxide salt.

6. The method of claim 5, wherein the hydroxide salt is selected from the group consisting of lithium hydroxide, rubidium hydroxide, cesium hydroxide, barium hydroxide, strontium hydroxide, potassium hydroxide, sodium hydroxide, magnesium hydroxide, calcium hydroxide, and mixtures thereof.

7. The method of claim 5, wherein the hydroxide salt is potassium hydroxide.

8. The method of claim 1, wherein the alkaline electrolyte composition is a polymeric gel.

9. The method of claim 8, wherein the polymeric gel comprises polyacrylic acid, polyacrylates, polymethacrylates, polyacrylamides, sulfonated-polymers or combinations thereof.

10. The method of claim 1, wherein the waste metal ion is a cation of a metal selected from the group consisting of zinc, chromium, tantalum, gallium, iron, cadmium, indium, thallium, cobalt, nickel, tin, lead, copper, bismuth, silver, mercury, gold, niobium, vanadium, manganese, aluminum, and combinations thereof.

11. The method of claim 1, wherein the alkaline electrolyte composition has a pH range of about 8 to about 11.

12. The method of claim 1, wherein the alkaline electrolyte composition has a pH range of about 9 to about 10.

13. The method of claim 1, wherein the electrolytic cell operates at a temperature in a range from about 0° C. to about 80° C.

14. The method of claim 1, wherein the electrolytic cell operates at a temperature from about 20° C. to about 65° C.

15. The method of claim 1, wherein the electrolytic cell operates at a temperature from about 20° C. to about 30° C.

16. The method of claim 1, wherein the voltage difference is a single cell voltage with a value within a range from about 0.01 volts to about 1.1 volts.

17. The method of claim 1, wherein the voltage difference across the cathode and the anode is maintained at a value that is less than the voltage necessary to affect any generation of hydrogen at the cathode and/or any generation of oxygen at the anode.

18. The method of claim 1, wherein
the first conducting component is nickel and the second conducting component is platinum;
the waste metal ion is a cation of a metal selected from the group consisting of zinc, chromium, tantalum, gallium, iron, cadmium, indium, thallium, cobalt, nickel, tin, lead, copper, bismuth, silver, mercury, gold, chromium, niobium, vanadium, manganese, aluminum, and combinations thereof;
the alkaline electrolyte composition has a pH range of about 8 to about 11.

19. A method of recovering metal ions from water comprising:
applying a voltage to an electrolytic cell, comprising
a cathode with a first conducting component,
an anode with a second conducting component selected from the group consisting of cobalt, copper, iron, nickel, platinum, iridium, ruthenium, rhodium, and mixtures thereof and alloys thereof, and
an alkaline electrolyte composition in electrical communication with the anode and the cathode, wherein the alkaline electrolyte composition has a pH value of about 11 or less and wherein the alkaline electrolyte composition comprises at least one metal ion to be reduced, and a sacrificial reductant comprising urea,
wherein the voltage is applied to the electrolytic cell across the cathode and the anode and is sufficient to reduce the at least one metal ion to form at least one elemental metal species at the cathode, and to oxidize the sacrificial reductant at the anode, and less than about 20% of the voltage is spent generating hydrogen at the cathode and/or oxygen at the anode; and
recovering the at least one elemental metal species.

* * * * *